United States Patent [19]

Hofer et al.

[11] Patent Number: 4,937,440
[45] Date of Patent: Jun. 26, 1990

[54] SYSTEM AND METHOD FOR BEAM FARFIELD SHIFT FOCUS COMPENSATION

[75] Inventors: Gregory V. Hofer, Colorado Springs; James C. McDonald, Black Forest, both of Colo.

[73] Assignee: Hewlett-Packard Company, Palo Alto, Calif.

[21] Appl. No.: 400,097

[22] Filed: Aug. 29, 1989

[51] Int. Cl.$^5$ .............................................. G01J 1/20
[52] U.S. Cl. ............................ 250/201.5; 369/44.11
[58] Field of Search ................... 250/201 DF, 201 R; 369/44, 45, 46

[56] References Cited

U.S. PATENT DOCUMENTS

| 4,663,750 | 5/1987 | Hamanaka et al. | 250/201 DF |
| 4,695,158 | 9/1987 | Kotaka et al. | 250/201 DF |
| 4,866,688 | 9/1989 | Ohtake et al. | 369/46 |

Primary Examiner—David C. Nelms
Assistant Examiner—Que Tan Le

[57] ABSTRACT

A system and method for maintaining focus of a laser beam on the surface of an erasable magneto-optic disk during erase operations is disclosed. The laser beam exhibits beam farfield shift during erase operations, complicating the maintenance of optimal focus. An optical detector is exposed to laser light reflected to the disk to generate signals governing operation of a focusing lens' servo system. A digital signal processor is included in the servo system and is programmed to compensate for beam farfield shift by generation of an offset correction signal during periods of erase power operation. The offset correction signal is generated by the digital signal processor by comparison of optical detector output signals generated during operation of the laser source where no beam farfield shift occurs and the output signals generated where beam farfield shift is occurring, but the system is known to be in focus.

9 Claims, 5 Drawing Sheets

SYSTEM AND METHOD FOR BEAM FARFIELD SHIFT FOCUS COMPENSATION

FIELD OF THE INVENTION

The present invention relates generally to optical disk drive focus servo systems. In particular, the invention relates to focus of an illumination source used for scanning and in altering physical characteristics of an erasable magneto-optic disk.

BACKGROUND OF THE INVENTION

A storage medium is part of a computer's memory wherein programs and work files reside as digital data. Computer memory can include either, and commonly includes both, moving-type memory and non-moving type memory. Nonmoving memory is typically directly addressed, or accessed, by the computer's central processing unit. Moving memory, such as disk drives and magnetic tape, is indirectly accessed.

Moving memory typically has much greater data storage capacity than directly addressed memory and has much longer access times. Moving memory is also typically not volatile. That is, it survives turning the computer off. Nonmoving type memory is typically faster and more expensive per unit of memory than moving-type memory, and has less capacity. Moving-type memories are generally used for long-term storage of large programs and substantial bodies of information, such as a data base files, which are not in constant use by the computer, or which are too bulky to provide short term direct access memory capacity for.

The storage media of the moving-type memory are physically alterable objects. That is to say, they can be magnetized, grooved, pitted or altered in some detectible fashion to record information. Preferably the storage media is at the same time physically resilient, portable, cheap, of large capacity, and resistant to accidental alteration. A crude example of an analogous medium is a phonograph record wherein a wavy spiral groove represents an analog information signal. The various species of storage media used in moving-type memory for computers include magnetic tape, floppy disks, compact disk-ROM, Write-Once, Read-Many optical disks and, most recently, erasable magneto-optic disks. Each of these storage media exhibit detectable physical changes to the media representing binary data. To read, and where applicable to erase and write data to the media, mechanical apparatuses are provided which can be directed to the proper location on the physical media and carry out the desired function.

Magneto-optic storage disks are similar in appearance to optical compact disks used for storing recorded music. In one common form the disks are five and a quarter inch diameter flat disks having a central axis for being engaged and spun by a drive motor. The disk encloses a material of known reflective properties encased in a hard, transparent protective shell. In erasable magneto-optic disks the reflective material is also a magnetic material which can support local magnetic domains or regions. The reflection characteristics of the surface of the disk depend upon the local magnetic domain state. Detection of the changes in reflectivity is enhanced by polarizing the incident radiation hitting the surface of the optical disk. While the changes in reflection characteristics are subtle, the orientation of the magnetic dipole in each local region can be detected by measuring selected phase characteristics of the polarized light reflected by the region. Thus each local region can represent one piece of binary data with the orientation of the magnetic dipole being associated with the data value.

The magnetic field of the material is reversible and thus erasure and repeated rewriting on the disk is possible. When the reflective material is in its solid phase, the magnetic domains are substantially locked. When the material is in its liquid phase, an outside magnetic field can be used to set the magnetization of the material, which is substantially locked upon solidification of the material. Where the liquid phase is limited to a local region, the magnetic polarization of just that local region can be changed.

Liquification of a local region is provided by heating the selected local region with a laser beam and applying a magnetic field to the region during the resulting liquid phase. The area freezes while the field is present, thus setting the magnetic polarization of the local region. A focusing or objective lens is used to focus the laser beam at the surface of the disk. The tighter the focus of the laser beam used to heat the region, the smaller this region will be, reducing the power requirements to melt the material. Regions can then be allowed closer to one another increasing data density.

The local regions in which data are stored are typically arranged serially in a plurality of concentric tracks on the face of a disk. Groups of local regions are identified by track and sector designation relating to a coordinate system for locating and relocating the local regions. The tracks may be a portion of a spiral groove on the face of the disk, similar to the groove in a record, or they can be a series of concentric grooves.

The grooves are optically detectable allowing a read/write head to be oriented over the center of the groove while the disk spins underneath the head. The read/write head carries a laser source, the objective lens for focusing the laser beam and an optical detector for developing positioning signals for the objective lens. One of the positioning signals is generated by a tracking servo loop, which operates to center the read/write head, and thereby the objective lens, over the groove. Another positioning signal is generated by a focus signal servo loop and brings a focal point of the objective lens to the surface of the erasable disk.

The same laser source is used for a read operation, a write operation and an erase operation. Distinct power levels exist for each of these operations. Particularly during write and erase operations, close maintenance of the focal point at the disk surface is necessary to bring sufficient energy to a local region area to melt the region. Because the surface of the disk is not perfectly flat, the focal point must be constantly moved to maintain focus of the beam at the surface of the disk. Movement of the focal point is done by moving the objective lens.

The optical detector includes an array of optical sensors located behind the objective lens which produce output signals in response to laser light reflected by the surface of the disk impinging on the sensors. The radial distribution of energy around the central axis of the laser beam is functionally related to the output signals from the sensors. The output signals can thus be related to the position of the focal point. During the read operation the distribution of power in the beam is substantially symmetric about any axis cutting perpendicularly through the center of the beam. A signal processor can readily operate on the outputs of the optical detector to properly position the focal point. During the erase operation this is not the case. The energy distribution of the laser beam can become strongly asymmetric in patterns not predictable from laser to laser. This phenomenon is known as beam farfield shift. The asymmetric energy distribution of the reflected laser light can result in false indications of loss of focus and in false indications of proper focus when in fact optimal focus has been lost.

Some prior art magneto-optic memory systems have ignored this problem, which can lead to the failure to completely erase a sector of memory regions. Other prior art devices have locked the position of the objective lens in the position generated in the most recent read operation. Unfortunately, magneto-optic disk surfaces are not perfectly flat, and this approach results in a loss of focus stemming from movement of the disk. Again incomplete erasure can result.

SUMMARY OF THE INVENTION

The invention is directed to optimization of the focus of a laser beam at the surface of an erasable magneto-optic disk during erase operations performed on the disk. The laser beam is generated by a laser source for which at least two power output levels exist, including a low level of output for which the laser beam has an axially symmetric radial energy distribution, and a higher level of output for which the radial energy distribution of the laser beam is subject to farfield shift.

A collimator is provided for collimating coherent light generated by the laser source into a collimated laser beam. The collimated laser beam is directed through a positionable objective lens to bring the laser beam to a focus at the focal point. An objective lens positioning system is provided for positioning the objective lens with respect to the erasable optical disk so that the focal point can be positioned at the surface of the erasable optical disk. An optical detector including a plurality of photosensitive output signal generators is positioned with respect to the erasable magneto-optic disk to be impinged by the portion of the laser beam reflected by the erasable magneto-optic disk. A signal processor responds to the output signals for generating a focus error signal for moving and maintaining the focal point at the surface of the magneto-optic disk.

The digital signal processor is adapted to position the objective lens during a low power operation of the laser source to bring the focus of the laser beam to the surface of the disk. Just prior to transition to higher power operation, the signal processor samples the current normalized focus error signal and stores it to memory. Immediately subsequent to a transition of the laser source from the low power output level to the high power output level, prior to movement of the lens to compensate for indicated out of focus operation, the signal processor samples and stores to memory the last normalized focus error signal. The two normalized focus error signals are combined to provide an offset correction signal for the adjustment of the focus error signal during the balance of the erase operation.

DETAILED DESCRIPTION OF THE PREFERRED EMBODIMENTS

Figure 1:
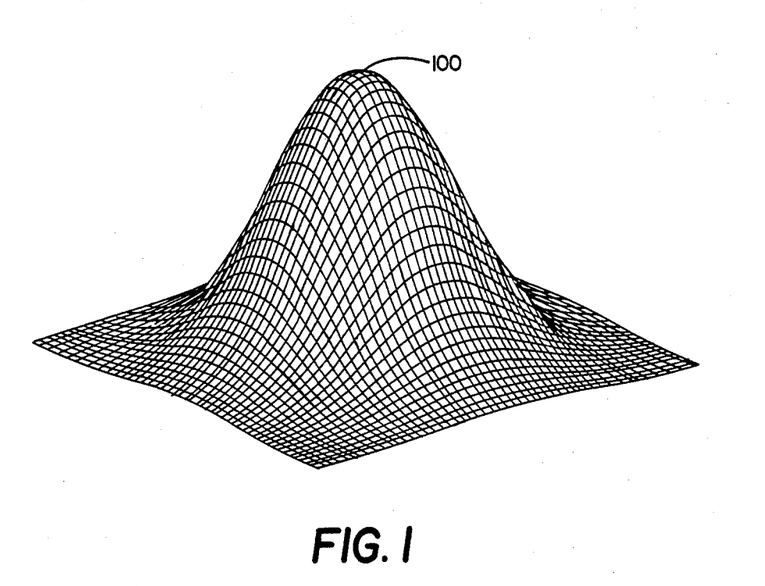
FIG. 1 is an exemplary graphical profile of the radial power distribution of a collimated laser beam at a power setting not exhibiting farfield shift.
Figure 2:
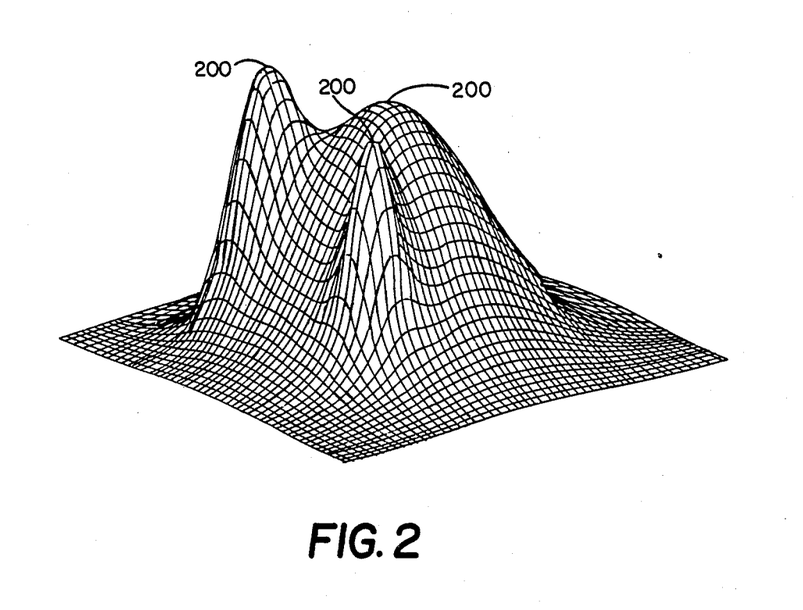
FIG. 2 is an exemplary graphical profile of the radial power distribution of a collimated laser beam at a power setting exhibiting farfield shift.

FIGS. 1 and 2 illustrate the effects of beam farfield shift on the radial (cross-sectional) radiant energy distribution of a collimated laser beam. The laser beam is of a type produced by a typical laser diode source. In FIG. 1 the laser source is being operated at a low power level, corresponding to read operations in an erasable magneto-optic disk memory system. The laser beam has a single, radially centered point 100 of maximum intensity. The energy intensity slopes off smoothly in all directions from point 100. FIG. 2 illustrates a shift of the diode to a higher power output level at which the laser beam exhibits farfield shift. The energy intensity distribution laser beam now has several local energy intensity maxima 200. The exact distribution of energy is unpredictable. The energy intensity distribution may change with each shift to erase power in a given laser source, with aging of the laser source, or from other factors.

Figure 3A:
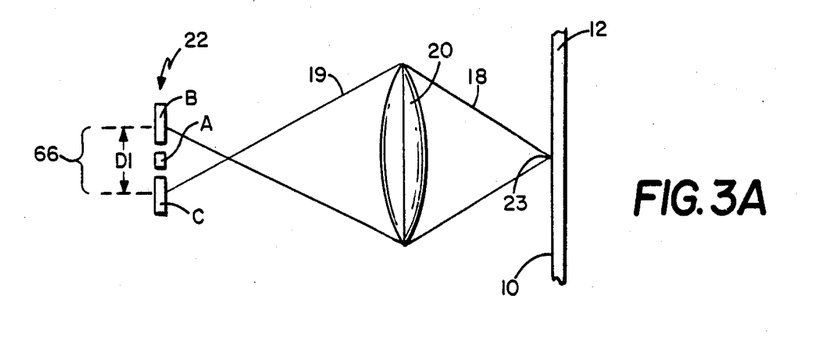
FIGS. 3A, 3B and 3C are illustrations of the effects of relative movement of a objective lens and a magneto-optic disk on the relative position of a focal point of a laser beam transmitted through the lens with respect to the magneto-optic disk.
Figure 3B:
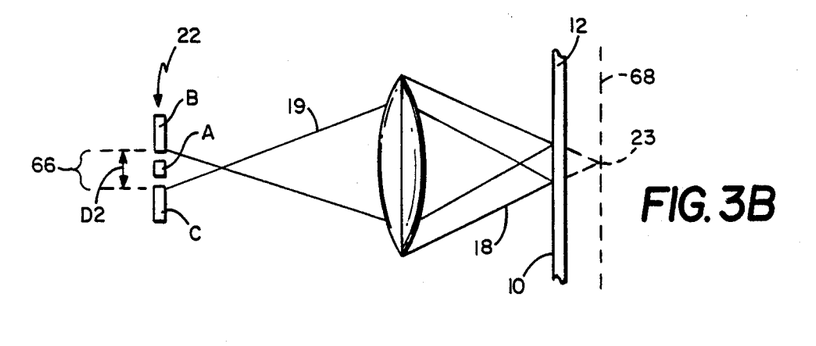
Figure 3C:
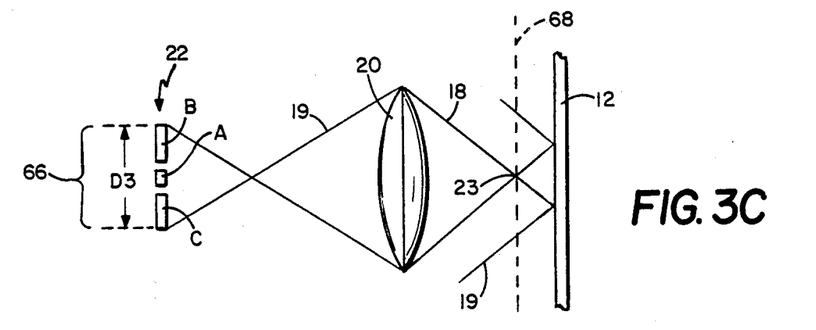

FIGS. 3A, 3B and 3C illustrate the relative optical orientation of the major optical elements of a magneto-optic disk drive. The elements include a magneto-optic disk 12, an objective lens 20 for focusing a laser beam 18, and an optical detector 22 for detecting reflected radiation 19 from the optical disk 12. Collimation of laser beam 18 is ignored for the sake of simplicity. Optimal operation of the disk drive requires focusing and maintaining focus of laser beam 18 on the moving magneto-optic disk 12. Loss of focus of laser beam 18 is caused by changes in displacement between objective lens 20 and a magneto-optic disk 12. Changes in focus change the relative degree of illumination of optical detector 22, which is used to move objective lens 20 to restore focus. In FIG. 3A laser beam 18 is in focus, with focal point 23 of laser beam 18 positioned at the surface of magneto-optic disk 12. Disk 12 reflects a portion of the radiant energy back through objective lens 20 to optical detector 22, creating a circular image 66 of diameter D1 illuminating portions of detection signal generating elements A, B and C of optical detector 22.

FIGS. 3B and 3C illustrate changes in the diameter of image 66 as focus of laser beam 18 is lost. In FIG. 3B objective lens 20 and magneto-optic disk 12 are too close, resulting in the image of focal point 23 falling behind the surface of the disk in plane 68. Consequently, reflected image 66 has a reduced diameter D2 and elements B and C of optical detector 66 are substantially unilluminated. The intensity of illumination falling on element C is increased. In FIG. 3C objective lens 22 and disk 12 are too far apart and focal point 23 falls in front of the surface of the disk in plane 68. Consequently, the diameter D3 of reflected image 66 is larger, in this case illuminating substantially all of bars A, B and C, effecting the relative proportions of incident radiation falling on the elements and the strength of the detection signals generated thereby. In the case of FIG. 3C, portions of the reflected radiant energy do not reach the bars at all, with a commensurate loss in output from the photosensitive elements. Under normal operation of a focus servo loop, the magnitude and polarity of the focus control signal will cause correction in the displacement of lens 20 from disk 12 in the situation indicated by FIGS. 3B and 3C. Beam farfield shift however results in unpredictable variation in the strength of the signals generated by elements A, B and C. In the prior art this effect severely compromised focusing during erase operations.

Accurate placement of focal point 23 at the surface of an erasable magneto-optic disk 12 is essential to ensure that sufficient power per unit area is present to melt the region. The size of each bit area on a magneto-optic disk is essentially determined by the area of focal point 23. For the wavelength of the radiant energy used in the preferred embodiment, this is a location with a diameter of about 1 micron. Liquification is necessary to allow use of a relatively weak externally applied magnetic bias field to reorient the magnetic dipole of the bit region, without disrupting the magnetic dipoles of the adjacent portions of magneto-optic disk 12, or of the disk as a whole.

Figure 4:
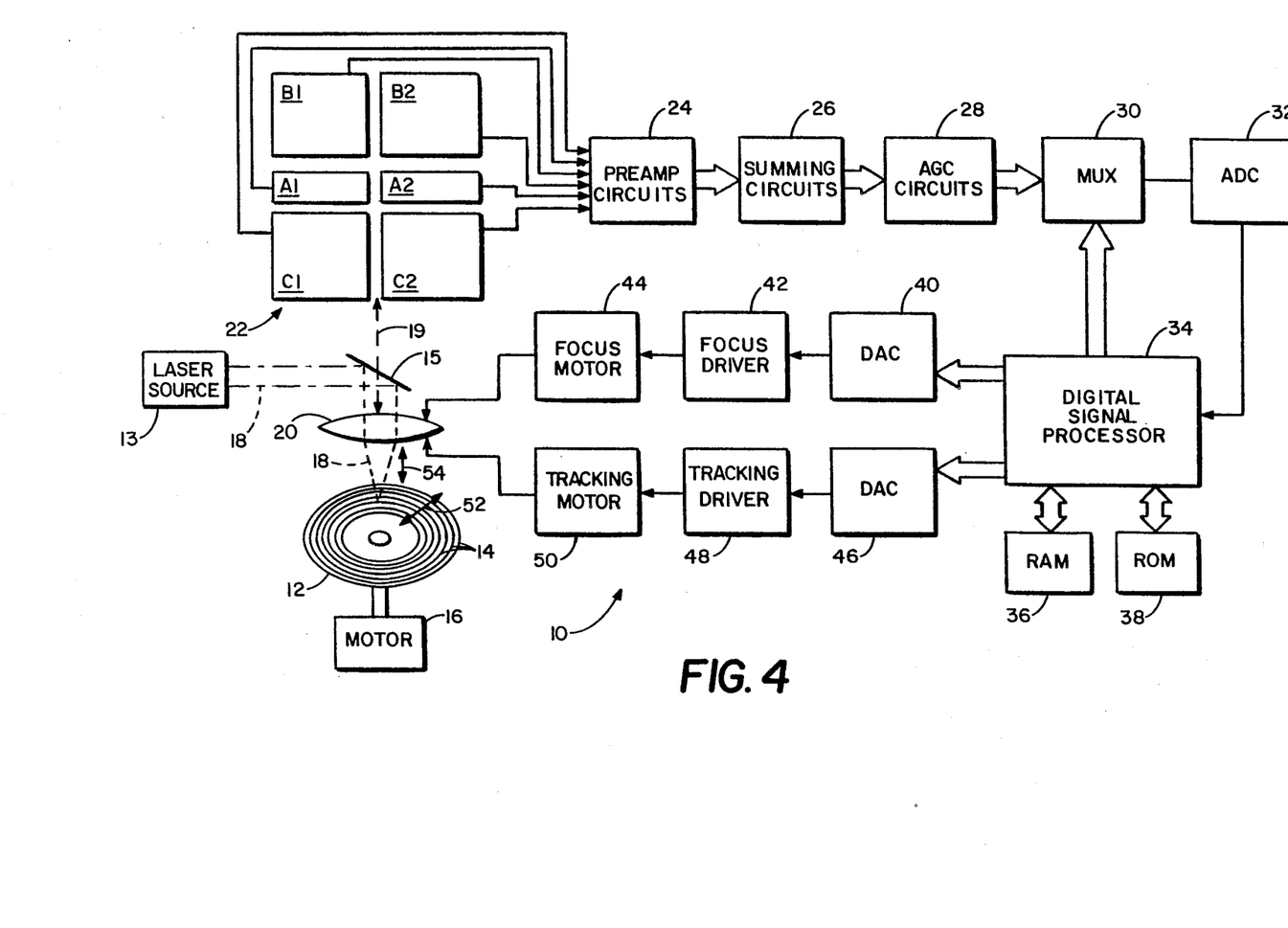
FIG. 4 is a block diagram representation of a magneto-optic disk drive servo system.

A magneto-optic disk drive 10 incorporating servo system compensation for maintaining on track and in focus operation is illustrated in FIG. 4. Disk drive 10 includes magneto-optic disk 12 which is rotated by a motor 16. Binary data is located at discrete positions (not shown) along tracks 14, which are disposed concentrically on the surface of disk 12. Data is written to, read from and erased from the discrete locations in part through use of a laser beam 18 from a laser source 13. Access to a particular set of discrete data locations requires directing the laser beam to the appropriate track 14 and focusing the laser beam on disk 12. Rotation of disk 12 then brings the appropriate data locations under the laser. A tracking servo loop positions objective lens 20 along tracking axis 52 to bring it over the appropriate track. Laser beam 18 is directed from laser source 13 through objective lens 20 by a beam splitter 15. A focus servo loop moves objective lens 20 up and down focus axis 54 to focus the laser beam onto disk 12.

A low or "read" intensity laser beam 18 is used to sense the orientation of the magnetic dipoles at the various data locations. Thus data can be read from disk 12 after the laser beam is focused onto the disk. Magnetic dipole orientation can be detected through variation in the polarization angle of light reflected by disk 12. As disk 12 rotates under read intensity laser beam 12, reflected light 19 is modulated in its polarization angle as a function of the magnetic orientations of the various data locations along a track. Modulated reflected light 19 impinges upon a pair of optical detectors 22 (only one of which is shown). Each detector includes six elements A1, A2, B1, B2, C1 and C2. Other detector element arrangements are known. A signal representative of the binary state of the data locations is derived differentially from the pair of detectors 22 in a known manner.

When writing or erasing data on tracks 14, a high intensity laser beam 18 impinges the individual data bit locations of disk 12, resulting in a small amount of material of disk 12 melting. A magnetic field from a magnetic source (not shown) is applied to the general area of the data location to establish a particular magnetic dipole at that location as the melted material resolidifies.

Disk drive 10 includes tracking and focus servo systems for accurately positioning objective lens 20 with respect to data locations of tracks 14 at which data is to be written, read or erased. Elements common to both the focus and tracking servo systems include objective lens 20, optical detector 22, a preamplifier circuit 24 (preamp), summing circuits 26, automatic gain control circuits 28 (AGC), multiplexer 30 (MUX), analog-to-digital converter 32 (ADC), and digital signal processor 34 with its associated random access memory 36 (RAM) and read only memory 38 (ROM) memory.

Elements specific to the focus servo system include digital to analog converter 40 (DAC), a focus driver 42 and a focus motor 44. Elements specific to the tracking servo system include a digital-to-analog converter 46 (DAC), tracking driver 48 and tracking motor 50. The tracking servo system positions objective lens 20 along tracking axis 52 intersecting tracks 14 of disk 12. The focus servo system positions objective lens 20 along a focus axis 54 perpendicular to disk 14 to focus laser beam 18 on disk 12. The closed optical and electrical paths through the tracking and focus servo loops are feedback systems and are characterized as servo loops.

The reflected portion 19 of laser beam 18 is a signal modulated by the reflective characteristics of disk 12 which intersects elements A1, A2, B1, B2, C1 and C2 of optical detector 22. The output signal from each element of optical detector 22 is individually amplified by preamplifier circuits 24 and applied to summing circuits 26. Summing circuits 26 combine the elemental output signals in a predetermined manner to produce a focus error signal (FES), a tracking error signal (TES) and a hex sum signal (HEXSUM). The tracking error signal (TES) and focus error signal (FES) are particular to an optical detector having the geometry, number of elements and relative positioning of detector elements as optical detector 22.

Optical detector 22 is aligned in such a manner that the elongated space separating detector elements A1, B1, and C1 from elements A2, B2, and C2 is perpendicular to tracking axis 52. The tracking error signal is produced by summing circuits 26 as a function of the difference between the sum of the signals from detector elements A1, B1, and C1 and the sum of the signals from detector elements A2, B2, and C2. The tracking error signal is characterized by a generally sinusoidal shape with a polarity and magnitude corresponding to the direction and distance, respectively, that beam 18 is displaced from the center of the desired servo track 14. The focus error signal is generated as a function of the difference between the sum of the signals from detector elements B1, B2, C1, and C2, and the sum of the signals from detector elements A1 and A2. The focus error signal has a generally sinusoidal shape with a polarity and magnitude corresponding to the direction and distance, respectively, that objective lens 20 is displaced from the proper position to maintain focus. The hex sum signal is the sum of the signals from all six optical detector elements. The following table summarizes the specific signal combinations. Each alphanumeric symbol corresponds both to an optical detector element and the output signal generated by that element:

TABLE 1

A1 + A2 + B1 + B2 + C1 + C2 = HEXSUM
(A1 + B1 + C1) − (A2 + B2 + C2) = TES

TABLE 1-continued (B1 + C1 + B2 + C2) − (A1 + A2) = FES

The analog tracking error, focus error, and hex sum signals are each applied to automatic gain control circuits 28. Automatic gain control 28 normalizes the tracking error signal and focus error signal by dividing these signals by the hex sum signal as they are received from summing circuits 26. The normalized tracking error signal (NTES) and focus error signal (NFES) are individually applied to multiplexer 30 from AGC circuits 28.

Programmable digital signal processor 34 executes programs stored in ROM 38 relating to the processing of the normalized focus and tracking error signals, including a program relating to compensation for beam farfield shift at erase power. The function of the beam farfield shift program is set forth in greater detail with reference to FIG. 5. Those skilled in the art will now realize from the following discussion that the present invention can be realized in discrete analog circuitry as well as in a digital signal processor. A digital focus control signal is generated as a function of the normalized focus error signal. Digital signal processor 34 applies the digital focus control signal to digital-to-analog converter, which converts the signal to an analog signal. The analog focus control signal is converted to a focus drive signal having voltage and current characteristics required to drive focus motor 44, and thereby move objective lens 20 to a focused position.

Digital signal processor 34 also generates a digital tracking control signal as a function of the normalized tracking error signal. The tracking error signal is converted from a digital signal to an analog signal by digital-to-analog converter 46 and applied to tracking driver 48. Tracking driver generates a tracking drive signal suitable for driving tracking motor 50 which positions objective lens 20 centered over the appropriate track 14.

Figure 5:
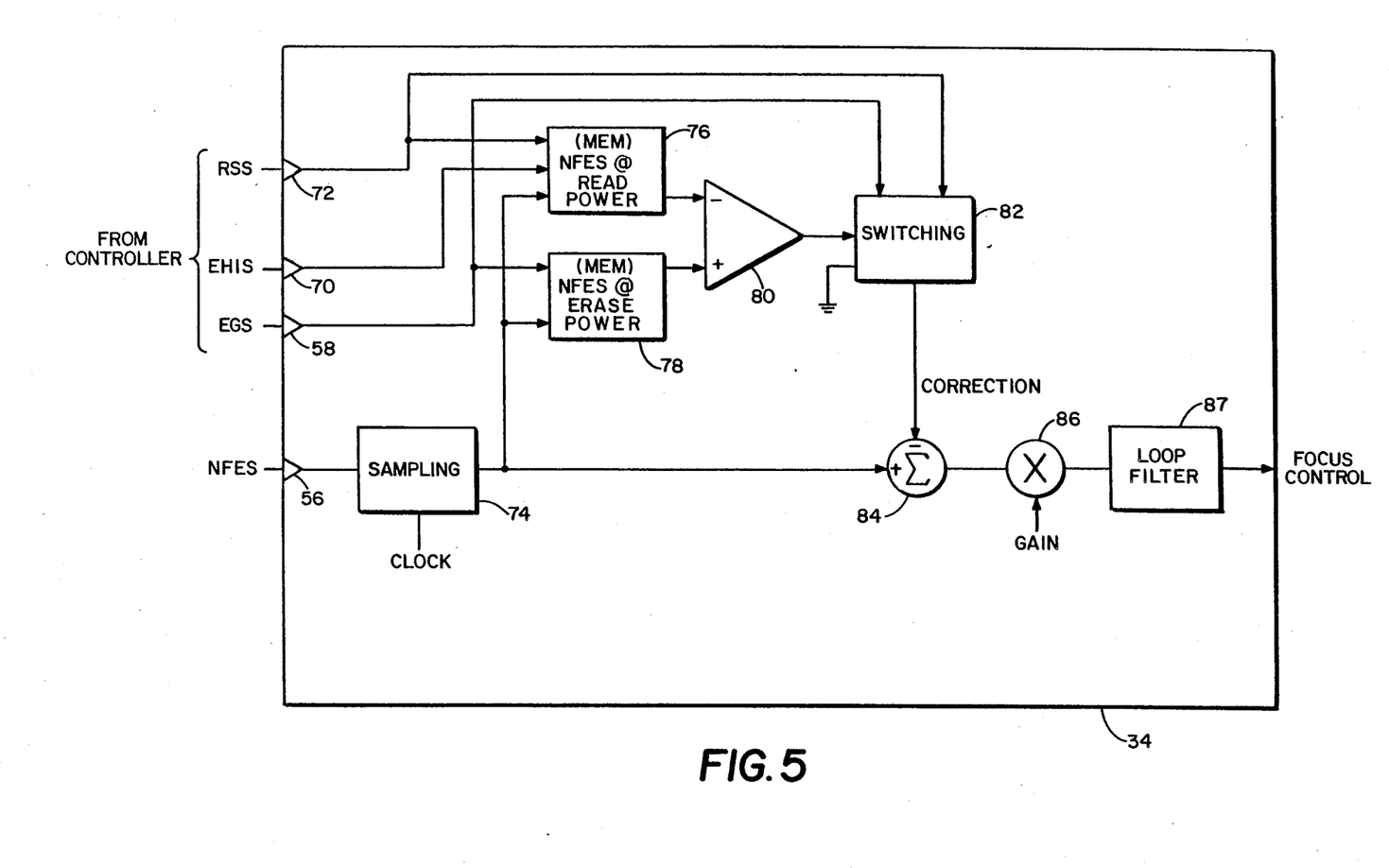
FIG. 5 is a functional block diagram representing operation of a digital signal processor in the focus servo loop.

FIG. 5 illustrates the operations performed on the normalized focus error signal generated at erase power by digital signal processor 34. It will be understood by those skilled in the art that digital signal processor 34 also processes the normalized tracking error signal. The normalized focus error signal (NFES) is received at input tab 56 from multiplexer 32 (shown in FIG. 4). Three other signals which control initiation of the modified error focus correction routine are received on input tabs 58, 70, and 72. An erase gate signal (EGS), indicating that the laser is being operated at erase power, is received on input tab 58. An erase header interrupt signal (EHIS), indicating that operation of the laser at erase power is imminent, is applied to input tab 70. A read strobe signal (RSS), indicating operation of the laser at read intensity, is applied to input tab 72. The erase gate signal, the erase header interrupt signal, and the read strobe signal are all generated by a disk drive controller (not shown).

The normalized focus error signal is periodically sampled by sampling gate 74. During read operation the laser beam should not exhibit farfield shift and the read strobe signal at input tab 72 indicates that the laser is being operated at read power. Logic switch 82 applies no correction factor to summing unit 84 in response to read power and the normalized focus error signal is passed to multiplier 86 in an unmodified state. Multiplier 86 multiplies the normalized focus error signal with a gain factor to generate an output signal related to the final focus control signal. A loop filter 87 connected to multiplier 86 filters the output signal of multiplier 86 to provide loop stability and to provide the focus control signal. Such techniques are well known and do not form part of the present invention.

Just prior to a shift to erase power from read power an erase header interrupt signal is applied to input tab 70. The read strobe signal at input tab 72 is also high, allowing a reading of the normalized focus error signal taken off of sampling gate 74 to be stored to memory 76. The erase gate signal then goes high and the read strobe signal goes low as erase power is applied to the laser diode. The last reading for the normalized focus error signal at read power is the one stored as erase power comes on and is termed herein as the read power level offset correction. A second memory register 78 retains the first normalized focus error signal occurring after the error gate signal goes high, indicating erase power operation. This stored signal is termed the erase power level offset correction. Immediately after erase power is generated, digital signal processor 34 has not had opportunity to attempt adjustment focus resulting from beam farfield shift. Because of the close proximity in time between the last read power level focus error signal generated, which was for a substantially focused system, and the first erase power level focus error signal generated, it can be assumed that the disk has not moved significantly and that the system is well focused for the first erase power level focus error signal, notwithstanding indication of out of focus operation resulting from beam farfield shift.

Because all focus error signals are normalized they can be directly compared. At summing junction 80 the read power level offset correction is subtracted from the erase power level offset correction to generate an erase offset correction signal. The erase offset correction signal represents the normalized deviation of the output of each detector element of optical detector 22, for a focused laser beam, between a laser beam of normal energy distribution and one exhibiting farfield shift. Thus the erase offset correction signal can be subtracted from each subsequent current sample of the normalized focus error signal to provide a corrected normalized focus error signal. The erase offset correction signal is transmitted to summing unit 84 by logical switch 82 in response to a high erase gate signal.

Figure 6:
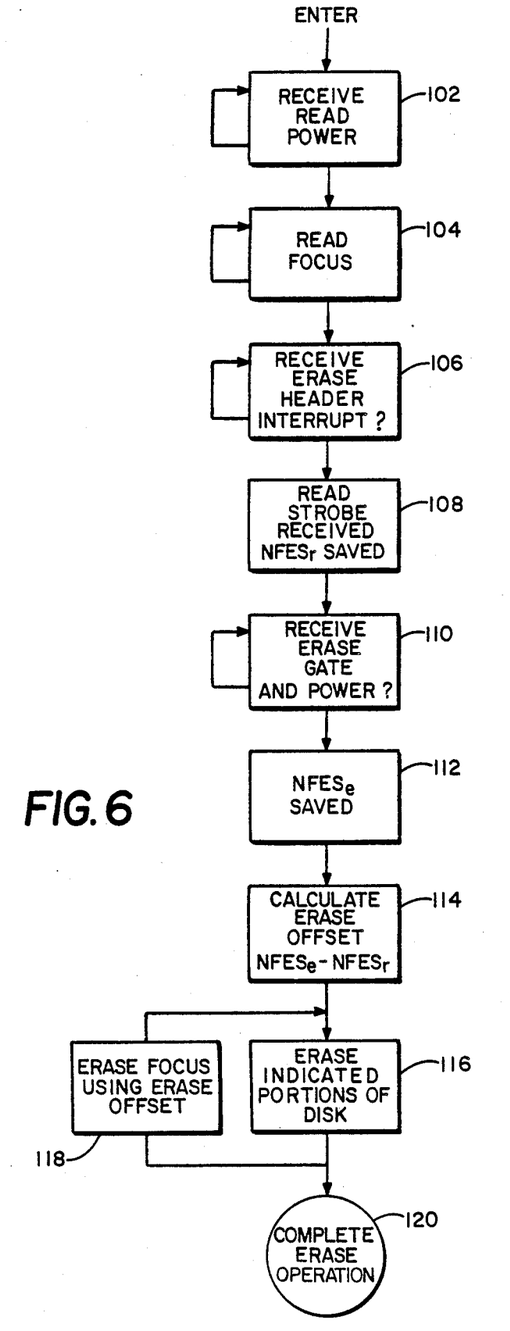
FIG. 6 is a flow chart illustrating the steps in the execution of a program for maintaining focus during operation of a read/write head at erase power.

FIG. 6 is a flow chart illustrating the steps in the execution of a program for maintaining focus during operation of a read/write head at erase power. Initially, read power is established from the laser source (step 102). An initial read power focus operation (step 104) is executed to establish focus. At step 106, an erase header interrupt signal is received by the digital signal processor indicating operation of the laser at erase power is imminent. At step 108 a read strobe is transmitted to digital signal processor 34 at which point the normalized focus error signal at read power (FES$_r$) is stored to memory. At step 110 erase power is established and an erase gate signal is received by the digital signal processor.

At step 112, immediately after receipt of the erase gate, the digital signal processor stores to memory the value of the normalized focus error signal at erase power (FES$_e$). At step 114 the erase offset correction is calculated. At step 116 erasure of the indicated portions of the disk are executed by the controller, the digital signal processor intervening to maintain focus through step 118, wherein the erase correction offset is combined with the normalized focus error signal prior to generation of the focus control signal. Step 120 indicates completion of the erase operation, which is associated with cessation of the erase gate signal.

Prior art optical systems have not maintained tight enough focuses of the laser beam to achieve uniform and high rates of success during erase operations. The present invention achieves the needed reliability.

Although the present invention has been described with reference to the preferred embodiment, those skilled in the art will recognize that changes may be made in form and detail without departing from the spirit and scope of the invention.

What is claimed is:

1. A system for focusing a laser beam on a substantially planer reflective surface, wherein the laser beam is characterized by a -predictable power distribution at operation of a laser source below a known energy level and to beam farfield shift at operation of the laser source above the known energy level, the system comprising:
   an optical system having a focus axis intersecting the reflective surface and a focal point along the focus axis;
   laser beam guidance for directing the laser beam from the laser source through the optical system toward the reflective surface;
   an optical detector positioned to detect the laser beam after reflection from the reflective surface and generating a plurality of output signals related to the radial distribution of energy of the laser beam after reflection;
   output signal summing circuitry combining the output signals and generating a focus error signal related to the spacing between the focal point and the reflective surface;
   a signal source providing a first signal indicating imminent change in operation of the laser source from below to above the known energy intensity level and a second signal indicating operation of the laser source above the known energy intensity level;
   signal processing circuitry responsive to the focus error signal for generating a focus control signal, the signal processing circuitry being further responsive to occurrence of the first and second signals to generate an offset correction signal derived from the state of the focus error signal at the time of receipt of the first signal and the state of the focus error signal just after first reception of the second signal, the offset correction signal being used during a subsequent continuous period of operation above the known energy level to compensate the focus error signal prior to generation of the focus correction signal; and
   a focus actuator responsive to the focus correction signal for moving the optical system along its focus axis.

2. The system for focusing a laser beam on a substantially planer reflective surface as set forth in claim 1, wherein the surface is a face of an erasable magneto-optic disk.

3. The system for focusing a laser beam on a substantially planer surface as set forth in claim 2, wherein the optical system comprises a convex objective lens.

4. The system for focusing a laser beam on a substantially planer surface as set forth in claim 3, wherein the optical detector further includes:
   a plurality of optically sensitive elements, each element adapted to generate an output signal which varies in relation with the radiant energy impinging thereon; and
   the elements being arranged with respect to one another such that the relative values of the output signals during low power operation indicate the quality of focus of the laser beam with respect to the surface.

5. The system for focusing a laser beam on a substantially planer surface as set forth in claim 4, wherein the signal processing circuitry further includes a memory for storing discrete measurements of the focus error signal.

6. A method for focusing a laser beam from a source on a surface, wherein the radial distribution of energy in the laser beam is unpredictable at selected power settings, the method comprising the steps of:
   generating a laser beam from the power source at a power setting for which the radial distribution of energy is substantially symmetric;
   directing the laser beam through an optical system having a focal point toward the surface;
   detecting light from the laser beam reflected by the surface back through the optical system;
   generating a set of signals indicating the radial distribution of energy of the reflected light around an axis;
   adjusting the relative position of the objective lens and the surface on the basis of the indicating signals to bring the focal point to the surface;
   adjusting the power output of the laser source to a setting where the laser beam has an unpredictable radial energy intensity distribution;
   generating a set of signals indicating the radial distribution of energy of the reflected light at the adjusted power output;
   developing an offset correction signal from the indicating signals; and
   thereafter adjusting the relative position of the optical system lens and the surface on the basis of subsequent indicative signals and the offset correction signal to bring the focal point to the surface.

7. In an optical disk drive including, an magneto-optic disk adapted for rotation, a laser source adapted for operation at high and low output power levels for generating a laser beam, an objective lens for focusing the laser beam onto the magneto-optic disk, a focus actuator for positioning the objective lens along a focus axis in response to focus control signals, an optical detector for detecting the laser beam after reflection by the magneto-optic disk and generating output signals indicating the cross sectional energy intensity levels of the laser beam, signal summing circuitry for generating a normalized focus error signal and signal processing circuitry coupled to the signal summing circuitry for generating a focus control signal to control the disk servo system in response to the detector signals, a method for operating the signal processing circuitry to compensate for beam farfield shield of the laser beam during operation of the laser source at high output power levels, a method comprising the steps of:
   operating the laser source at low power to generate a laser beam upon indication of impending high power operation;
   focusing the laser beam on the magneto-optic disk;
   generating and sampling a normalized focus error signal;

operating the laser source at high power to generate a laser beam characterized by possible beam far-field shift;

generating and sampling the normalized focus error signal at substantially the same area of the disk as the sample taken at low power;

generating an offset correction signal from the sampled normalized focus error signals;

compensating the focus error signal generated as the magneto-optic disk moves by the offset correction signal; and generating a focus control signal from the compensated normalized focus error signal.

8. The method of claim 7 wherein summing circuitry combines the output signals of the optical detector to generate a focus error signal related to the spacing between the magneto-optic disk, adds the output signals of the optical detector to generate a hex sum signal, and divides the focus error signal by a hex sum signal to generate the normalized focus error signal.

9. A magneto-optic disk drive comprising:

a magneto-optic disk having a substantially planer reflective surface;

a laser source for generating a laser beam at each of at least three discrete power levels associated with reading binary data from the magneto-optic disk, writing binary data to the disk, and erasing binary data from the disk;

the laser beam being characterized by a predictable cross sectional energy intensity distribution at operation at the power level associated with reading data, and being further characterized by beam far-field shift at operation of the laser source at the power level associated with data erasure;

an objective lens having a focus axis intersecting the reflective surface and a focal point along the focus axis;

laser beam guidance for directing the laser beam from the laser source through the objective lens toward the reflective surface;

an optical detector positioned to detect reflected laser light from the reflective surface and generating a plurality of output signals related to the radial distribution of energy of the laser beam after reflection;

output signal summing circuitry combining the output signals and generating a focus error signal related to the spacing between the focal point and the reflective surface;

a signal source providing a first signal indicating imminent change in operation of the laser source from the read associated power level and a second signal indicating operation of the laser source at the power level associated with erasure;

signal processing circuitry responsive to the focus error signal for generating a focus control signal, the signal processing circuitry being further responsive to occurrence of the first and second signals to generate an offset correction signal derived from the state of the focus error signal at the time of receipt of the first signal and the state of the focus error signal just after first reception of the second signal, the offset correction signal being used during a subsequent continuous period of operation above the known energy level to compensate the focus error signal prior to generation of the focus correction signal; and a focus actuator responsive to the focus correction signal for moving the objective lens along its focus axis.

* * * * *